United States Patent [19]

Reinartz et al.

[11] Patent Number: 5,249,853
[45] Date of Patent: Oct. 5, 1993

[54] HYDRAULIC ANTI-LOCK BRAKE SYSTEM

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 868,610

[22] Filed: Apr. 14, 1992

[30] Foreign Application Priority Data

Apr. 19, 1991 [DE] Fed. Rep. of Germany ....... 4112822
Feb. 14, 1992 [DE] Fed. Rep. of Germany ....... 4284416

[51] Int. Cl.$^5$ .................. B60T 13/14; B60T 15/36; B60T 8/32
[52] U.S. Cl. ................. 303/114.1; 303/84.1; 303/DIG. 2
[58] Field of Search ........... 303/114.1, 116.1, DIG. 1, 303/DIG. 2, 84.1, 117.1

[56] References Cited

U.S. PATENT DOCUMENTS 4,678,243 7/1987 Leiber ................. 303/114.1

FOREIGN PATENT DOCUMENTS 2194606 3/1988 United Kingdom ............ 303/114.1

*Primary Examiner*—Matthew C. Graham
*Attorney, Agent, or Firm*—Robert P. Seitter; J. Gordon Lewis

[57] ABSTRACT

In brake systems with a large boosting factor, relatively high pressures in the tandem master cylinder during an anti-lock control operation caused by start-up of a pump are prevented by an adjusting member which is controlled in response to the wheel braking pressure, to act upon a pressure-reducing valve inserted upstream of a power booster, so as to limit the booster pressure.

14 Claims, 6 Drawing Sheets

HYDRAULIC ANTI-LOCK BRAKE SYSTEM

BACKGROUND OF THE INVENTION

The present invention relates to an hydraulic brake system, in particular for anti-lock control.

A type of hydraulic brake system is known from German patent application P 40 02 730 comprising a first and a second booster piston accommodated in a braking pressure generator housing which both can be acted upon by the pressure of an auxiliary pressure source via a braking pressure control valve arranged in the braking pressure generator housing. In dependence on a push rod piston abutting on the first auxiliary pressure piston, the braking pressure control valve establishes a hydraulic connection either between the auxiliary pressure source and the first booster piston, in order to supply in a power-assisted fashion pressure fluid for the wheel brakes to the working pistons of the tandem master cylinder connected downstream of the booster piston, or it connects the booster piston with an unpressurized supply reservoir by means of a connection governed by the braking pressure control valve. Further, a pressure-reducing valve is interposed between the auxiliary pressure source and the hydraulic booster in order to limit the system pressure.

However, the described system has the disadvantage that relatively high pressures may occur in the tandem master cylinder in the event of anti-lock control since upon start-up of an auxiliary pressure pump required for the anti-lock control, the said pump will counteract the tandem master cylinder pressure, or the admissible stress limit of the system component parts will be reached upon failure of the front-axle brake circuit in consequence of the hydraulic transmission ratio and the boosting ratio of the brake power booster that is defined by construction.

Therefore, it is the object of the present invention to limit the pressure level prevailing in the braking pressure generator to an admissible extent if brake circuit failure occurs and/or if the described brake system is used for anti-lock control purposes.

SUMMARY OF THE INVENTION

This object is achieved according to the present invention by an adjusting member which is controlled responsive to the wheel braking pressure and moves the pressure-reducing valve to adopt a switch position limiting the servo pressure in the power booster.

The adjusting member is preferably formed by a piston-and-cylinder assembly. The braking pressure of a first brake circuit connected to the rear axle acts upon a servo piston which closes the pressure-reducing valve in a travel-responsive manner. Due to this a pressure-travel, conversion is effected in a simple fashion.

Further, it proves expedient in view of an anti-lock control of all vehicle wheels to furnish each brake circuit with an adjusting member irrespective of what brake circuit allotment there is, so that the pressure in each brake circuit can be sensed separately and can be transmitted to the pressure-reducing valve in the event of brake circuit failure or when anti-lock control is performed.

A particularly compact form of the pressure-reducing valve includes a stepped piston which is arranged coaxially in relation to a slide valve and which can be operated directly by any one of the two adjusting members.

It is a feature of the invention to hydraulically uncouple the two adjusting members so that one adjusting member can be acted upon hydraulically and actuated by the first brake circuit, while the other adjusting member can be acted upon hydraulically and actuated separately by the second brake circuit in order to cause activation of the pressure-reducing valve in dependence on the pressure level prevailing in the brake circuits.

Expediently, the two adjusting members form a sub-assembly, with the pressure-reducing valve, and they are arranged one behind the other in a joint housing bore.

DETAILED DESCRIPTION

Figure 1:
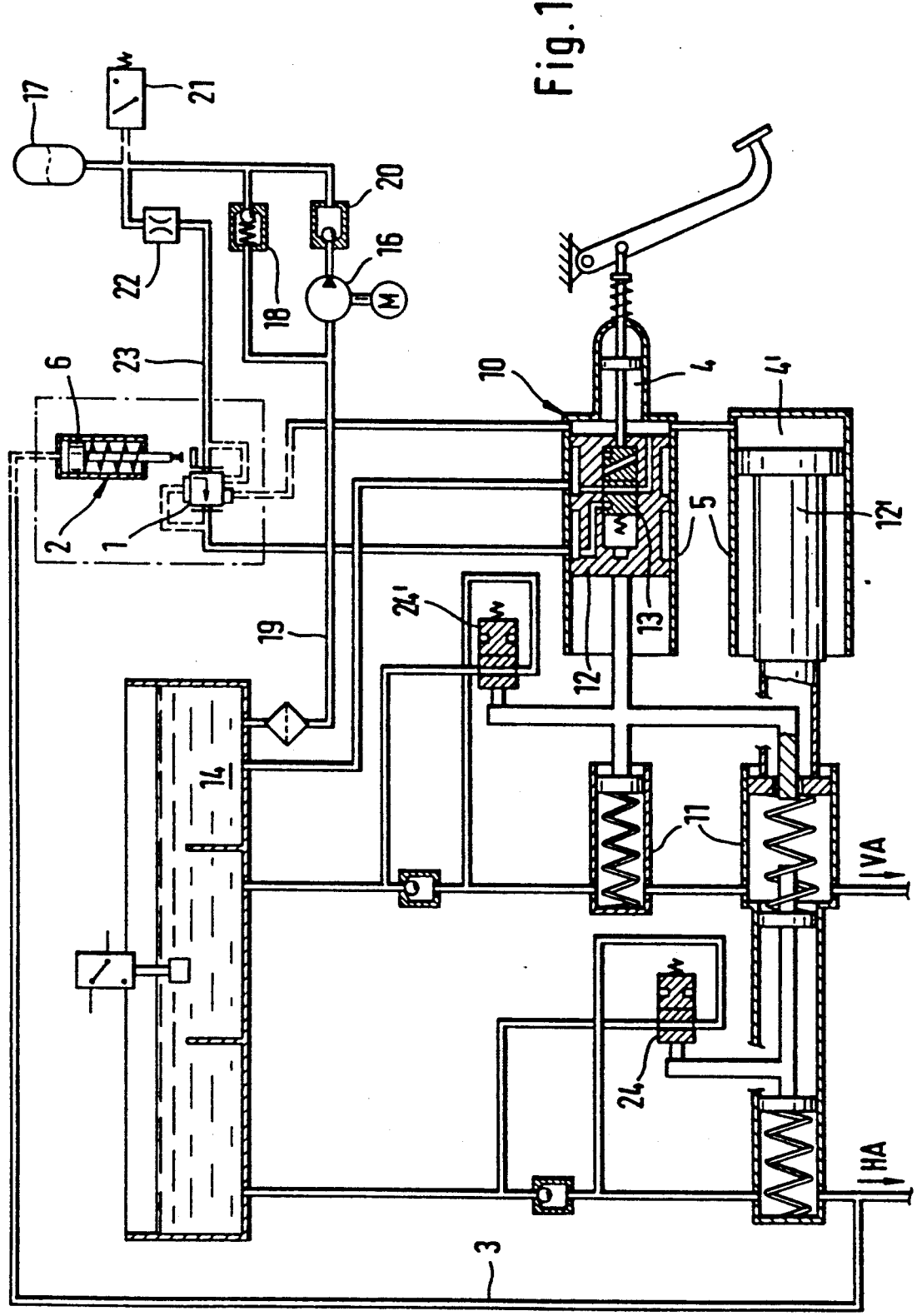
FIG. 1 is a hydraulic circuit diagram relating to a first embodiment of the inventive brake system.

FIG. 1 shows schematically a braking pressure generator 10 for operating the wheel brakes arranged on the rear axle HA and the front axle VA in the brake's release position. The braking pressure generator 10 comprises a tandem master cylinder 11 inserted upstream of which is a hydraulic power booster 5.

The hydraulic power booster 5 is provided with a first booster piston 12 which acts upon the push rod piston and which, in the brake's release position shown, is in hydraulic communication with a supply reservoir 14 via a braking pressure control valve 13 and which, on brake operation, is in hydraulic communication with an auxiliary pressure source.

A second booster piston 12' is connected in parallel to the first booster piston 12 in terms of effect. It acts via an associated pressure chamber 4' on the floating piston of the tandem master cylinder connected to the rear-axle brake.

The auxiliary pressure source comprises a pump 16 and an accumulator 17 In order to maintain the admissible pump pressure, a pressure-limiting valve 18 is inserted into a line branch between pump 16 and accumulator 17, which, once the maximum pressure is exceeded, discharges pressure fluid in the direction of the suction line 19 connecting the pump 16 with the supply reservoir 14. Further, there is provision of a non-return valve 20 acting to close in the direction of the pump pressure side in order to prevent the pressure fluid from flowing out of the accumulator 17 back to the pump 16. To monitor and control the accumulator charging pressure, a pressure switch 21 is arranged at the line connection of the accumulator 17.

When the brake is activated, pressure fluid propagates from the accumulator 17 via a restrictor 22 to a pressure-reducing valve 1 inserted in the auxiliary pressure line 23 which is responsive to both the pressure in the pressure chamber 4 of the power booster 5 and the pressure in the auxiliary pressure line 23 in order to reduce the pressure in case of lower demand.

Besides the control of the pressure-reducing valve 1 responsive to the auxiliary pressure, the pressure-reducing valve 1 can be actuated in a braking-pressure responsive manner by means of an adjusting member 2.

The adjusting member 2 is activated when the admissible pressure in the wheel brakes of the rear axle HA is exceeded.

For the purpose of pressure fluid supply of the tandem master cylinder 11, the braking pressure generator 10 as illustrated comprises pressure fluid connections to the supply reservoir 14 which keep the working chambers of the tandem master cylinder 11 open in the brake's release position by way of travel-responsive central valves, herein depicted as two-way/two-position directional control valves 24, 24'. Upon brake operation, the switch positions, shown symbolically in the initial position, of the two central valves 24, 24' and of the braking pressure control valve 13 illustrated as three-way/two-position directional control valve will be reversed so that the tandem master cylinder 11 is isolated from the supply reservoir 14, while the auxiliary pressure prevails on the booster piston 12.

It is accomplished by the action of the adjusting member 2 controlled by the rear-axle brake circuit HA on the pressure-reducing valve 1 that, due to the two parallel connected booster pistons in the power booster 5, the great boosting factor and, in the event of a possible failure of the front-axle brake circuit VA connected to the push rod piston, the correspondingly great hydraulic transmission ratio (hydraulic transmission=2) will not result in inadmissibly high pressures in the tandem master cylinder 11. Excessive pressure build-up in the tandem master cylinder 11 is prevented thereby.

Figure 2:
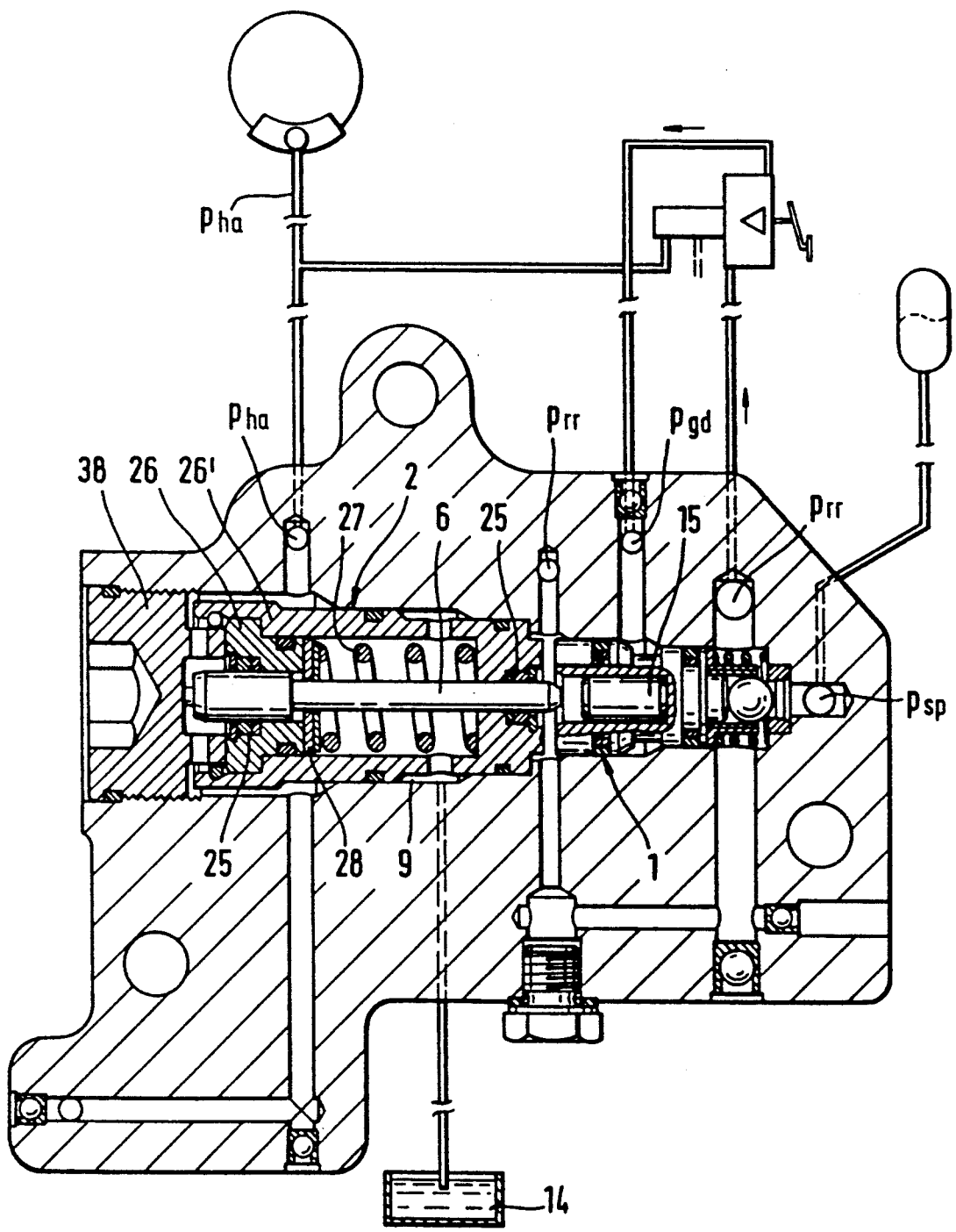
FIG. 2 is a cross-section taken through the pressure-reducing valve coupled to the inventive adjusting member incorporated in the system of FIG. 1.

FIG. 2 shows the construction of the pressure-reducing valve 1 and of the adjusting member 2 in longitudinal cross-section, the adjusting member 2 taking the form of a piston tappet disposed separately in the housing bore 9, arranged in series with the pressure-reducing valve 1. The adjusting member 2 is composed of a servo piston 6 which is radially enclosed by a sealing assembly 25 at its two end areas and is aligned within two taper sleeves 26, 26' which are slid coaxially into each other in the housing bore 9. The hollow space formed between the two taper sleeves 26, 26' accommodates a compression spring 27. The first spring end of the compression spring 27 is provided with a stop washer 28 and bears against the taper sleeve 26 sealing in relation to the rear-axle brake circuit HA. The hollow space accommodating the compression spring 27 comprises leakage ports leading to the supply reservoir 14.

The pressure-reducing valve 1 being a two-way slide valve is provided with a stepped piston and receives a spherical valve closure member on the smaller end surface remote from the adjusting member 2. The spherical valve closure member establishes an open connection between the accumulator pressure Psp and the booster inlet pressure Prr during normal braking so that the accumulator pressure may propagate to the power booster in dependence on the actuation of the braking pressure control valve.

Simultaneously, the booster pressure Pgd adjusted in the pressure chamber of the power booster acts as a basis pressure upon the piston step of the pressure-reducing valve 1. Since the booster inlet pressure Prr is effective on the pressure-reducing valve 1 both on the end surface facing the valve closure member and that averted therefrom, the booster pressure Pdg will determine the position of the pressure-reducing valve 1 as long as the rear-axle wheel braking pressure Pha applied to the adjusting member 2 will not exceed the force of the compression spring 27.

For the exact adjustment of the accumulator control, a fitting piece 15 which can be obtained in various length tolerances is inserted coaxially into the stepped piston of the pressure-reducing valve 1, the fitting piece 15 bringing about the engagement between the servo piston 6 and the pressure-reducing valve 1 when the operating pressures of the tandem master cylinder are exceeded.

Figure 3:
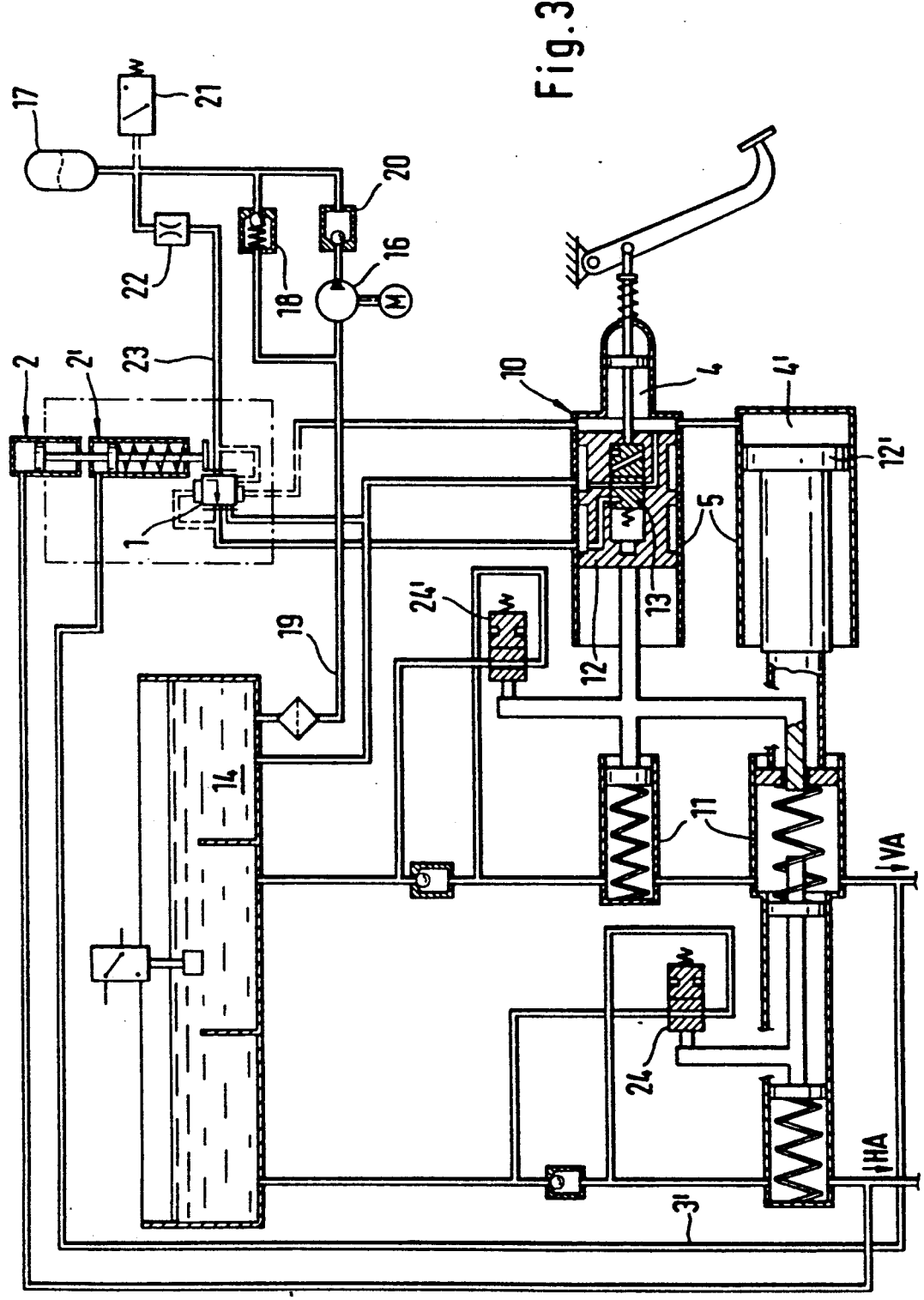
FIG. 3 is a hydraulic circuit diagram of a system according to FIG. 1 modified by adding another adjusting member.

In analogy with FIG. 1, FIG. 3 shows the hydraulic circuit diagram of the brake system extended by another adjusting member 2' which has a pressure fluid connection 3' to the front-axle brake circuit VA actuated by the push rod piston. Here the coaction of two adjusting members 2, 2' can be seen from the simplified view, the adjusting members 2, 2' being arranged coaxially one behind the other and operating the pressure-reducing valve 1 mechanically in dependence on the pressures prevailing in the brake circuits. For the purpose of operating the brake system as an anti-lock prevention means, this creates the precondition to monitor inadmissible pressures in both brake circuits fed by an auxiliary pressure pump and hence in the tandem master cylinder 11 with a view to finally reducing if necessary the servo pressure in the power booster 5 by activation of the adjusting members 2, 2'.

The pressure reduction on failure of a brake circuit described in FIG. 1 remains unaffected by this measure so that what has been explained hereinabove already in respect of a brake circuit failure in FIG. 1 remains applicable to FIG. 3 without reservation.

Inasfar as not all the details of FIG. 3 are referred to herein, they are identical with the elements described in FIG. 1 in respect of their arrangement, function, designation and numbering.

Figure 4:
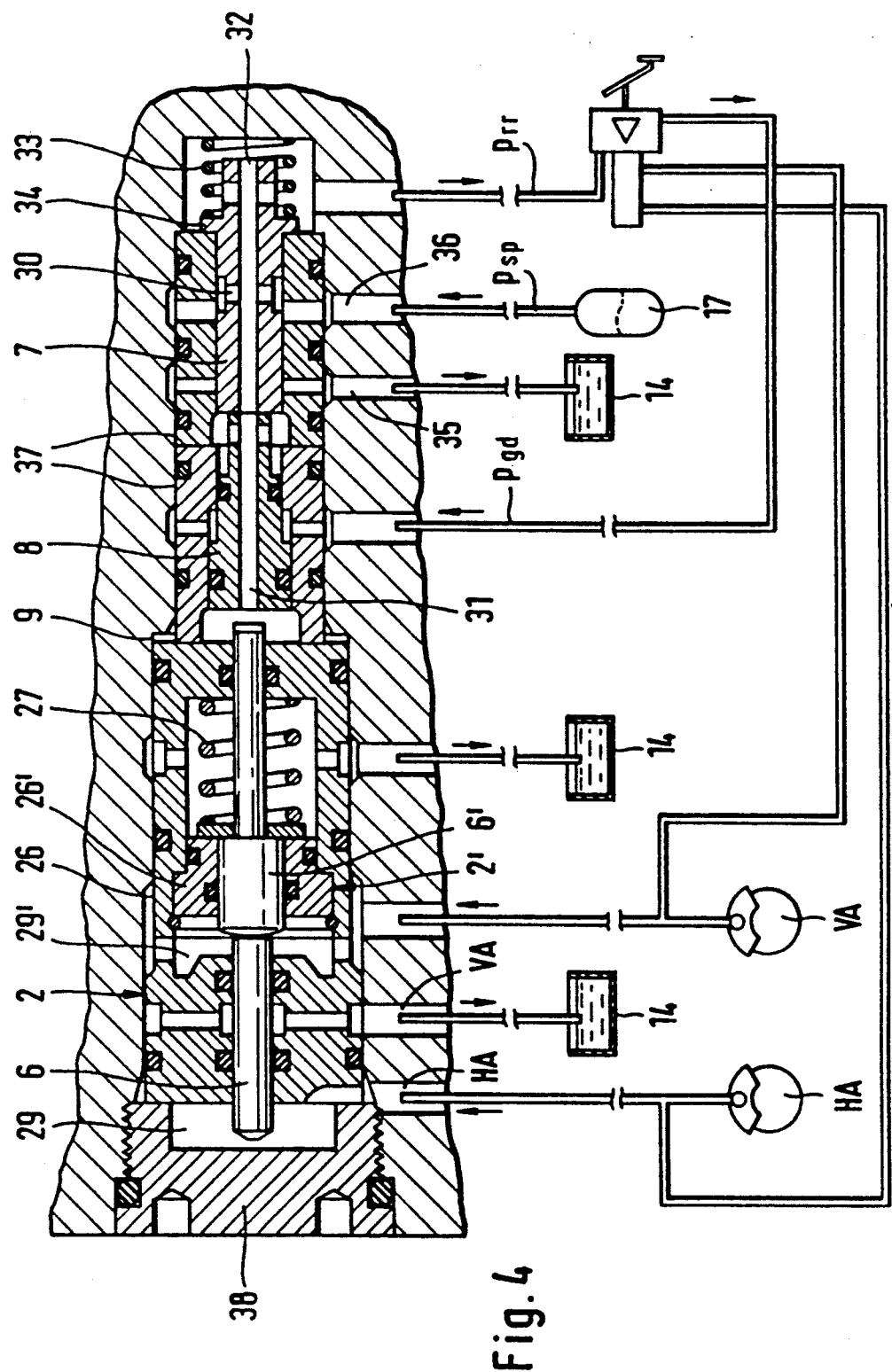
FIG. 4 is a cross-section taken through the pressure-reducing valve coupled to the two adjusting members, incorporated in the system of FIG. 3.

With reference to the hydraulic circuit of FIG. 3, FIG. 4 shows an expedient construction of coupling the adjusting members 2, 2' to the pressure-reducing valve 1, arranged in a common housing bore 9, as a component part of the braking pressure generator. The construction unit shown in longitudinal cross-section is composed of a coaxial series connection of servo pistons 6, 6'. The servo piston 6 positioned on the left hand side in the drawing is part of the first adjusting member 2, while on the left side of the servo piston 6 a pressure chamber 29 is disposed which is exposed to the pressure of the floating-piston brake circuit on the master cylinder side. The wheel brake connection to the rear axle HA known from FIGS. 1 and 3 connects to the floating-piston brake circuit to this end.

On the side remote from the pressure chamber 29 is another pressure chamber 29' which is associated with the second adjusting member 2' and which is connected to the push-rod piston brake circuit on the master cylinder side. This brake circuit corresponds to the wheel brake connection to the front axle VA known from FIGS. 1 and 3 so that due to the structural series arrangement of the two adjusting members 2, 2', the servo piston 6' exposed to the pressure of the push-rod brake circuit is operable irrespective of the servo piston 6 exposed to the pressure of the floating-piston brake circuit.

As viewed in the drawing, the pressure-reducing valve 1 formed of a stepped piston 8 and a three-way slide valve 7 likewise in coaxial series connection is arranged on the right side of the two adjusting members 2, 2'. The stepped piston 8 is directly operable through a tappet-shaped piston extension of the adjusting member 2' in connection with the front-axle brake circuit. Besides, the stepped piston 8 abuts with its end surface remote from the adjusting member 2 on the three-way slide valve 7.

The annular surface of the stepped piston 8 is acted upon by the booster basis pressure Pgd adjusted in the pressure chamber of the power booster, while on both sides of the stepped piston 8 the accumulator pressure Psp is effective as long as a cross bore 30 incorporated in the three-way slide valve 7 opens the connection between the accumulator 17 and the longitudinal bores 31, 32 penetrating the three-way slide valve 7 and the stepped piston 8. The three-way slide valve 7 adopts its basic position on the end surface remote from the stepped piston 8 caused by a collar-shaped stop 34 acted upon by a compression spring 33.

Hence, a permanent hydraulic connection is established between the accumulator 17 and the power booster 5 in the initial position in that the accumulator pressure Psp propagates through the partly opened cross bore 30 and longitudinal bore 32 in the three-way slide valve 7 up to the chamber which receives the compression spring 33 and has an inlet connection to the power booster 5 and to which thereby the booster inlet pressure Prr is applied. The portion of the three-way slide valve 7 remote from the spring chamber closes with its peripheral surface the return bore 35 leading to the unpressurized supply reservoir 14 as long as the force transmitted from the compression spring 33 on the three-way slide valve 7 exceeds the forces of the adjusting members 2, 2'. As soon as the admissible pressure increase is reached in the tandem master cylinder, the adjusting forces of the adjusting members 2 and 2', respectively, will prevail which lead to actuation of the stepped piston 8. The cross bore 30 arranged on the three-way slide valve 7 closes the supply channel 36 emanating from the accumulator 17 by way of the control edge.

Upon further pressure increase in the tandem master cylinder, e.g. due to a brake circuit failure or due to an anti-lock control, the three-way slide valve 7 is displaced until the return bore 35 leading to the unpressurized supply reservoir 14 is opened. The pressure fluid supply from the accumulator 17 to the power booster 5 is closed so that exceeding of the admissible system pressure in the brake system and hence in the tandem master cylinder can be prevented. The pressure fluid connections leading to the stepped piston 8 and to the three-way slide valve 7 comprise radial inlets within the guiding bushings 37 receiving the stepped piston 8 and the three-way slide valve 7. Likewise the housings accommodating the pistons of the two adjusting members 2, 2' are designed as taper sleeves 26, 26' which are provided with radial grooves for incorporating housing seals.

Radially extending leakage bores are arranged in the insert parts which conduct possibly occurring slot fluid leakages to the supply reservoir 14. The parts inserted in the housing bore 9 are closed in a pressure-tight manner by means of a threaded plug 38. At both end areas, the stepped piston 8 is provided with radial grooves to accommodate ring seals.

The special advantage of the combination of pressure-reducing valve and adjusting member compared to FIG. 2 resides in that not only shutting-off of accumulator pressure fluid in relation to the booster pressure fluid inlet can be performed owing to the use of a three-way slide valve 7, but that simultaneously discharge of pressure fluid in the direction of the supply reservoir can take place via the slide edge close to the stepped piston 8. Pressure fluid leakages and pressure increases in the brake system ensuing therefrom can thus be mastered by the stepped piston 8 and the three-way slide valve 7 in that the three-way slide valve is displaced by the adjusting members 2, 2' further in the direction of the compression spring 33 and pressure fluid propagates via the return bore 35 to the supply reservoir 14.

Further, the tandem arrangement of the two adjusting members 2, 2' allows adjustment of the pressure-reducing valve components by means of fitting pieces 15 as shown in FIG. 2 in order to accomplish adaption and adjustment, respectively, in the response behavior when two separate adjusting members are used.

Figure 5:
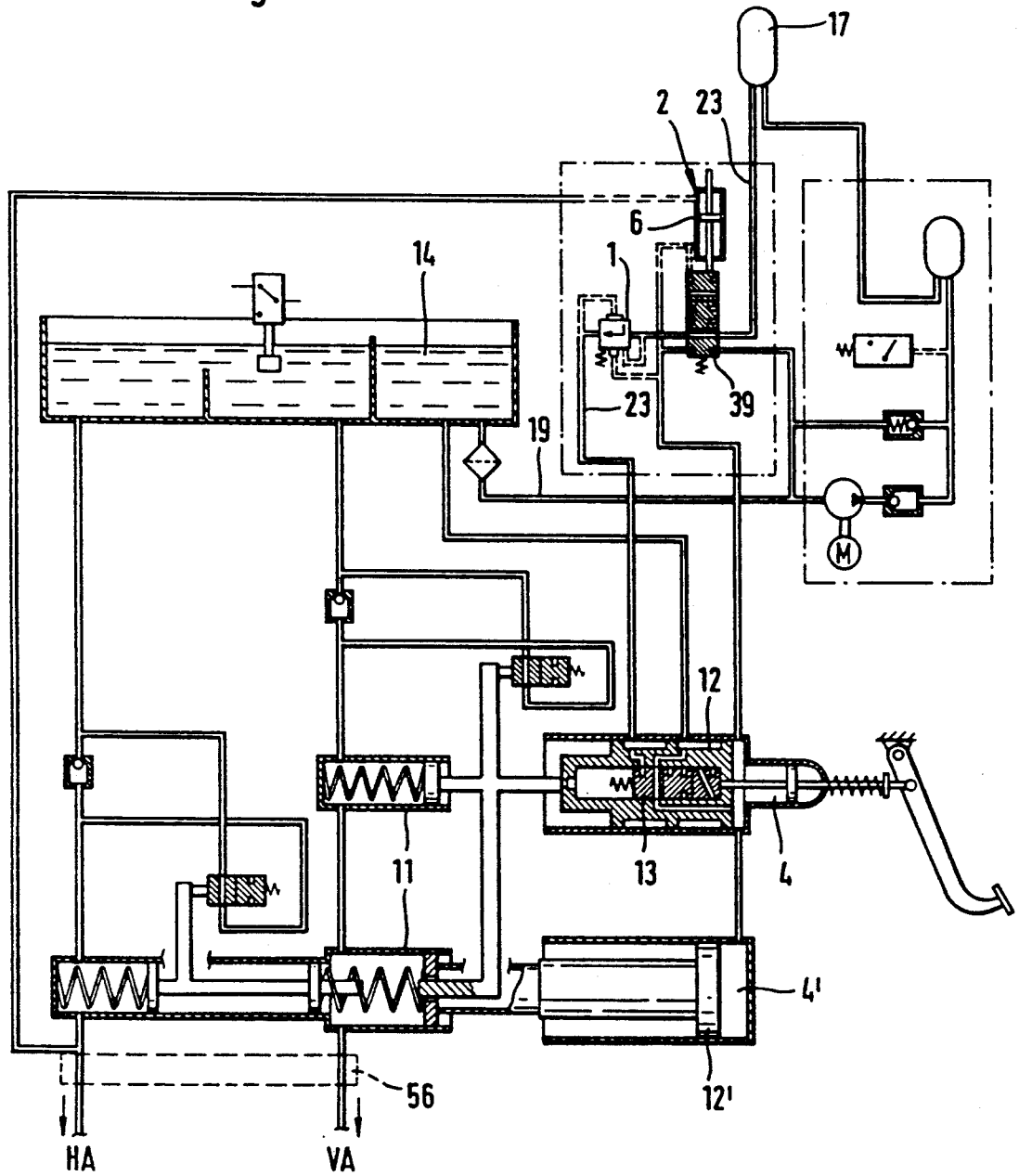
FIG. 5 is another embodiment of a hydraulic circuit of the brake system of the invention.

A hydraulic circuit configuration for a brake system can be taken from FIG. 5 which distinguishes over the first embodiment (FIG. 1) substantially by the arrangement of a protection valve 39 intended especially for the operation of the brake system in the anti-lock mode. The protection valve 39 is inserted as a four-way/three-position directional control valve between the accumulator 17 and the pressure-reducing valve 1 into the auxiliary pressure line 23. Further, the servo piston 6 arranged on the protection valve 39 is acted upon by a pressure port connected to the pressure chambers 4, 4' of the power booster instead of by the piston-resetting spring shown in FIG. 1.

The advantage thereof is that an accurate control of the servo piston 6 is ensured in dependence on the pressures acting in the pressure chambers 4, 4' of the power booster and those acting in the working chamber of the master cylinder 11.

The other details of the hydraulic circuit according to the illustration are largely identical to FIGS. 1 and 3, respectively, as regards their design and the mode of function resulting therefrom.

The brake system of FIG. 5 differs in operation from the hydraulic circuit of shown in FIG. 1 as follows:

In the brake's release position all, function parts adopt their initial position shown in the drawing, according to which pressure fluid disposed in the accumulator 17 can propagate unhinderedly via the open protection valve 39 and the pressure-reducing valve 1 until to the annular chamber of the booster piston 12. The braking pressure control valve 13 drawn symbolically in the booster piston is closed. Hence the booster pistons 12, 12' and the master cylinder pistons persist in the brake's release position.

The braking pressure control valve 13 is caused by the operation of the brake pedal to adopt its open position so that auxiliary pressure fluid can propagate via the auxiliary pressure line 23 into the pressure chambers 4, 4' of the power booster. The pressure adjusted in the pressure chambers 4, 4' is simultaneously applied to the pressure-reducing valve 1 and the servo piston 6, while first the pressure-reducing valve I and the protection valve 39 remain in their initial position as long as the respectively admissible operating pressure is not prevailing in the working chamber of the master cylinder 11 and in the pressure chambers 4, 4' of the power booster. The control point for the pressure reduction is augmented with the auxiliary pressure 4, 4' rising in the pressure-reducing valve 1. When an excessive pressure build-up in the master cylinder 11 occurs, e.g. due to failure of the front-axle brake circuit VA, whereby the rear-axle braking pressure HA can rise due to a too great amount of introduceable pedal forces, the servo piston 6 acted upon by the rear-axle braking pressure shifts the protection valve 39 to assume its closed position. The auxiliary pressure line 23 and the connection of the pressure chambers 4, 4' to the unpressurized supply reservoir 14 is then closed in this position.

If braking pressure control (not shown in the drawing) is activated on account of excessive brake slip values, braking pressure modulation takes place by means of valves (valve block 56) inserted into the rear-axle and front axle brake circuits HA, VA. To this end, the pressure adjusted in the pressure chambers 4, 4' of the power booster is limited by the protection valve 39 shutting off the auxiliary pressure line 23 and by pressure discharging into the unpressurized supply reservoir 14 as soon as the adjusting force acting upon the servo piston 6 is in excess of the controlled pressure in the power booster in the case of an excessive braking pressure prevailing in the rear-wheel brake circuit. Thus inadmissibly high pump pressures in the master cylinder and in the power booster can be avoided during the anti-lock control.

Figure 6:
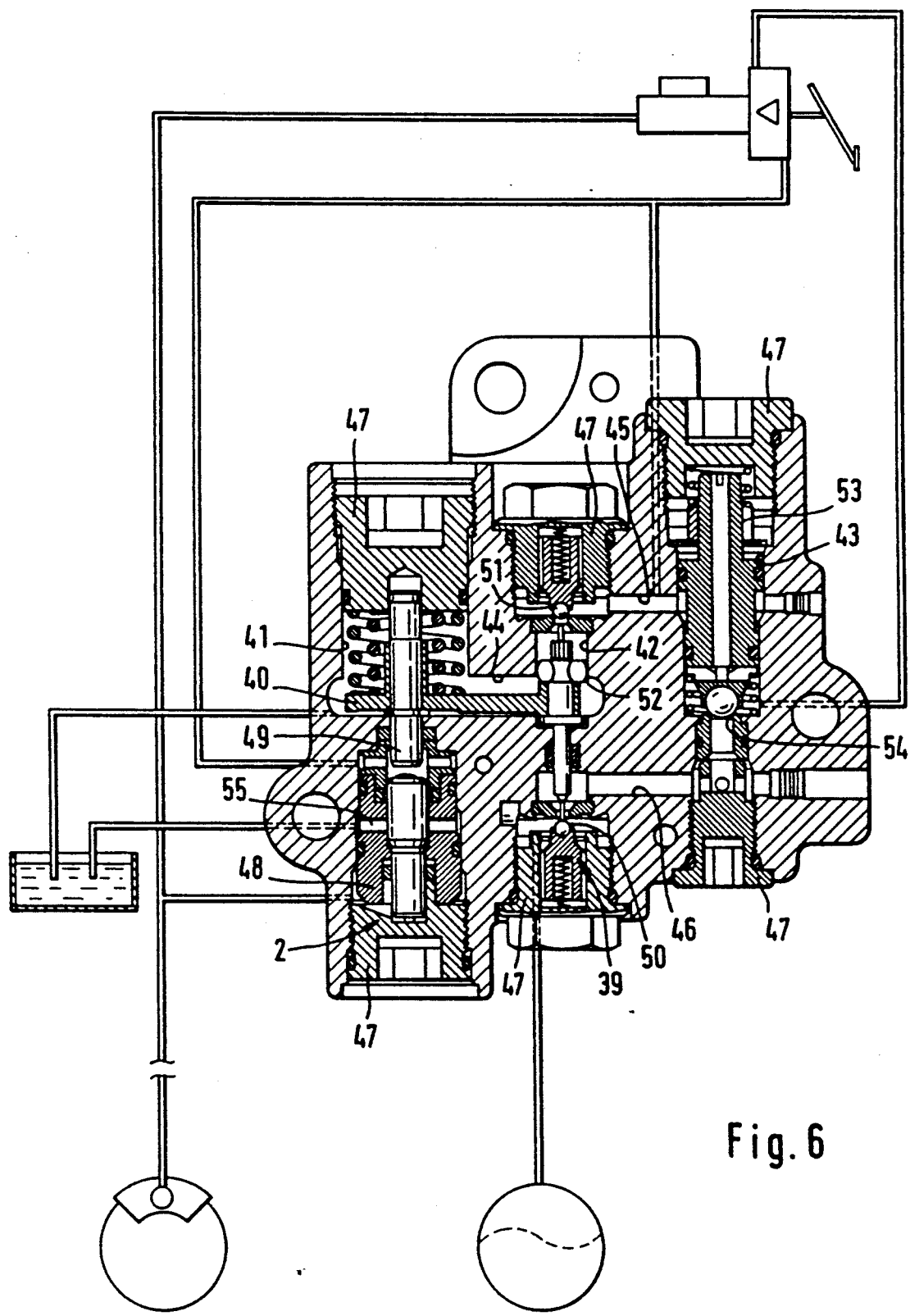
FIG. 6 is a cross section of the pressure-reducing valve with the protection valve and the adjusting member in a joint housing block incorporated in the brake system in FIG. 5.

FIG. 6 shows an embodiment of the pressure-reducing valve 1, of the protection valve 39 and the adjusting member 2 within a housing shown in a cross-sectional view. The afore-described function elements are movably guided in three paraxial longitudinal housing bores 41, 42, 43. The longitudinal bores are designed as stepped bores which are closed on both sides by means of screw-in plugs 47. The servo piston 6 is guided within a bushing 48 which is retained in the stepped housing bore 41 by a screw-in plug 47. Arranged coaxially relative to the servo piston 6 is an axially movable actuating piston 49, at the traverse 40 of which a compression-spring assembly is abutting. The traverse 40 extends within a cross bore 44 terminating into another longitudinal bore 42, the inside width of the cross bore 44 corresponding to the working stroke of the protection valve 39 fitted to the traverse 40. The protection valve 39 is substantially designed as a spherical seat valve, with the balls 50, 51 being guided on both sides of the valve tappet 52 in the screw-in plug 47 loaded by a compression spring. Serving as guidance for this purpose are hollow-cylinder-shaped insert parts on whose ends respectively facing the valve tappet 52 the spherical seat valves are fitted.

The two associated valve seats are jammed in the stepped longitudinal bore 42, while the openings of the valve seats are penetrated each by a needle-like tapered end area of the valve tappet 52. The tapered end area of the valve tappet 52 respectively enclosed by an annular chamber is in communication each via a cross bore 45, 46 terminating in front of and behind the valve closure member into the longitudinal bore. The pressure-reducing valve 1 is furnished with a stepped piston 53 loaded by a compression spring on the side of the spherical valve closure member.

The valve seat 54 cooperating with the spherical valve closure member of the pressure-reducing valve is held by a screw-in plug 47. Opposed thereto is another screw-in plug 47 which, by means of a compression spring, loads the friction ring of the pressure-reducing valve 1 fitted onto the stepped piston.

The braking pressure of the master cylinder 11—see in this respect also FIG. 5—acts upon the servo piston 6 between the bushing 48 and the screw-in plug 47. The controlled pressure (see FIG. 5) emanating from the pressure chambers 4, 4' of the power booster is introduced between the servo piston and the actuating piston 49. The cross bore 44 receiving the traverse 40 is in communication with the unpressurized supply reservoir just as the leakage bore 55 is which is directed to the circumferential surface of the servo piston 6 and which is arranged in the bushing 48.

Another connection to the cross bore comprising the traverse 40 leads to the supply reservoir 14. In the event of a lifting movement of the traverse 40, the upper ball 51 which is arranged on the protection valve according to the drawing opens the passage to the cross bore 45 to which normally the controlled pressure of the power booster (see pressure chambers 4, 4' in FIG. 5) is applied, so that this cross bore is also connectible to the supply reservoir 14.

As a result, likewise the annular chamber of the pressure-reducing valve 1 communicating with the cross bore 45 described hereinabove becomes unpressurized. The cross bore 46 terminating into the pressure-reducing valve 1 downstream of the spherical valve closure member in the drawing is normally in communication with the accumulator 17 due to the spherical seat valve 51 being open in the protection valve, and it is closed indirectly by the stroke of the traverse 40 in the aforementioned case. To this end, first the ball 50 shuts off the passage before the ball 51 opens the further passage.

We claim:

1. An antilock hydraulic brake system having a pedal for actution, comprising a power booster having a pressure chamber, a braking pressure generator actuated by said power booster, wheel brakes of a front axle and a rear axle connected to said braking pressure generator by bake circuits, an auxiliary pressure source comprising a pump and an accumulator, said braking pressure generator including a housing arrangement, an auxiliary pressure line connecting said auxiliary pressure source and said braking pressure generator; at least one booster piston sealingly guided in said housing arrangement and having an end surface defining a hydraulic pressure chamber, a braking pressure control valve controlling auxiliary pressure in said pressure chamber in dependence on said pedal actuation, an unpressurized reservoir, said pressure control valve including means communicating said pressure chamber with said unpressurized supply reservoir, a pressure-reducing valve interposed between said auxiliary pressure source and said braking pressure control valve and including means sensing the pressure in said pressure chamber of said hydraulic power booster as well as that in said auxiliary pressure line, a first adjusting member and actuating means actuating said pressure-reducing valve by said first adjusting member, including an hydraulic connection between a first brake circuit and said first adjusting member causing said first adjusting member to perform a pressure reduction in said pressure chamber of said hydraulic power booster in dependence on wheel braking pressure in said first brake circuit.

2. An antilock brake system as claimed in claim 1, wherein said first adjusting member is comprised of a piston-and-cylinder assembly having a servo piston acted upon by pressure of said first brake circuit, said first rake circuit connected to said rear axle, said actuating means actuating said pressure reducing valve closing said pressure-reducing valve in response to travel of said servo piston.

3. An antilock brake system as claimed in claim 2, wherein a second adjusting member is provided, and means applying hydraulic pressure of a second brake circuit to said second adjusting member, said second brake circuit connected to said front axle and said second adjusting member arranged in series with said first adjusting member.

4. An antilock brake system as claimed in claim 3, wherein said pressure-reducing valve comprises a stepped piston and a three-way slide valve, said stepped piston arranged coaxially to said three-way slide valve, said stepped piston operable directly by engagement with said second adjusting member.

5. An antilock brake system as claimed in claim 4, wherein said second adjustment member includes a servo piston movable by hydraulic pressure of said second brake circuit to abut on said stepped piston of said pressure-reducing valve, acted upon irrespective of the hydraulic pressure of said first brake circuit acting on said first adjusting member.

6. An antilock brake system as claimed in claim 5, wherein said servo piston of said first adjusting member and said servo piston of said second adjusting are member incorporated coaxially one behind the other.

7. An antilock brake system actuated by a pedal, comprising a power booster having a pressure chamber, a braking pressure generator, a braking pressure generator housing arrangement, wheel brakes for a front axle and a rear axle connected, to said braking pressure generator, an auxiliary pressure source consisting of a pump and an accumulator, an auxiliary pressure line connecting said auxiliary pressure source and said braking pressure generator, at least one booster pistons sealingly guided in said housing arrangement of said braking pressure generator, said booster piston having an end surface defining a hydraulic pressure chamber, a braking pressure control valve controlling the application of auxiliary pressure in said pressure chamber in dependence on said pedal actuation, an unpressurized supply reservoir, said braking pressure control valve communicating said pressure chamber with said unpressurized supply reservoir, a pressure-reducing valve interposed between said auxiliary pressure source and said braking pressure control valve and sensing the pressure in said pressure chamber of said hydraulic power booster and in said auxiliary pressure line, an adjusting member comprising a servo piston, a protection valve interposed between said pressure-reducing valve and said auxiliary pressure source, means for applying wheel braking pressure to said servo piston, said adjusting member servo piston acting on said protection valve so as to keep said auxiliary pressure line open in a first switch position of said servo piston, and closing said auxiliary pressure line in at least one further switch position of said servo piston.

8. An antilock brake system as claimed in claim 7, further including mean causing the pressure in said pressure chamber of said power booster to be applied to one side of said adjusting member in opposition to said wheel braking pressure.

9. An antilock brake system as claimed in claim 7 wherein said protection valve is a four-way/three-position directional control valve.

10. An antilock brake system as claimed in claim 9, further including a suction line extending from said booster pressure chamber to said unpressurized supply reservoir via said protection valve, and wherein in a first switch position, said protection valve keeps said auxiliary pressure line open and keeps said suction line to said pressure chamber closed, and in a second switch position, said auxiliary pressure line and said suction are closed, and in that in a third valve switch position said suction line is opened, and said hydraulic connection from said auxiliary pressure source to said pressure-reducing valve is interrupted.

11. An antilock brake system as claimed in claim 7, further including a housing having coaxial bores therein, wherein said pressure-reducing valve together with said protection valve and adjusting member are assembled together into said coaxial bores.

12. An antilock brake system as claimed in claim 11, wherein said coaxial bores are penetrated by cross bores, and in that one cross bore communicates with said protection valve and said pressure-reducing valve, said one cross bore is exposed to the pressure of said auxiliary source pressure, and another of said cross bores is exposed to the controlled pressure of the pressure chamber of said booster.

13. An antilock brake system as claimed in claim 12, wherein said another of said cross bores comprise a movable element connecting said protection valve with said adjusting member.

14. An antilock brake system as claimed in claim 13, wherein the inside diameter of said another of said cross bores corresponds at least to the stroke of said adjusting member which is transmitted from the adjusting member to said protection valve.

* * * * *